United States Patent [19]
Heider et al.

[11] 3,807,481
[45] Apr. 30, 1974

[54] DEVICE FOR SHIELDING SUNLIGHT

[76] Inventors: Karl Adam Heider, Stormstrasse 17, 8500 Nurnberg; Peter Forg, No. 48, 8551 Mitteldorf, both of Germany

[22] Filed: Feb. 16, 1972

[21] Appl. No.: 226,844

[30] Foreign Application Priority Data
Feb. 23, 1971 Germany............................ 2108493

[52] U.S. Cl. ............................................... 160/45
[51] Int. Cl. ............................................ E04f 10/00
[58] Field of Search ............................... 160/66–78, 160/19, 20, 22, 45, 49, 25, 220, 237, 241, 319; 52/64, 69

[56] References Cited
UNITED STATES PATENTS
1,539,774  5/1925  Sato................................... 160/237
2,474,747  6/1949  Madriguera........................ 160/237
1,275,510  8/1918  Wason................................. 160/25
849,219  4/1907  Ecker................................. 160/241

*Primary Examiner*—Peter M. Caun

[57] ABSTRACT

There is provided a device for shielding sunlight from a balcony, terrace or the like comprising a blind and support members therefore which allow the blind to be moved into a view-shielding position along the outer side of the balcony as well as into a sunlight-shielding position above the balcony. The blind may be a rigid planar element carried on vertically adjustable supports or a fabric sheet rolled between two horizontally spaced, parallel beaming rollers.

11 Claims, 6 Drawing Figures

DEVICE FOR SHIELDING SUNLIGHT

BACKGROUND OF THE INVENTION

The invention relates to a sunlight-shielding device for wall-mounted balconies or the like, the device having a movable blind above the balcony capable of being adjusted into a sun-shielding position.

The heretofore known sunlight-shielding devices of this nature, e.g., in the form of awnings, are mounted on the wall in a stationary position over a balcony, terrace, etc. and when needed are extended out approximately horizontally from the wall and over the balcony or the like in order to thus intercept the sun's rays. This form of sun-shielding device cannot fulfill its intended purpose when, for example, the sun stands very low on the horizon, and this is why auxiliary pieces of fabric or the like are frequently attached to the lowered awning.

There often exits, especially in urban and suburban areas having blocks of high-density housing, the desire to make it impossible for one's neighbors to be able to look upon a balcony or terrace. Up until now it has been attempted to accomplish this result through the use of appropriate plants along the balcony railing or by attaching auxiliary curtains or the like to the underside of the balcony positioned immediately above. With a plant there exists the disadvantage that a considerable expenditure of time and money is required for its care, and moreover, the possibility does not exist to move the plant aside when it is desired to have an uninterrupted view. In addition, a plant deprives the room adjacent to the balcony of a comparatively large amount of light during periods when it is not desired to protect the balcony from view. The attachment of curtains or the like is – not to mention the fact that a ceiling surface is required – unsatisfactory because with drawn curtains, the entrance of sunlight onto the balcony is also made impossible.

SUMMARY OF THE INVENTION

With the present invention, the above described difficulties are now overcome in a surprisingly simple manner, namely, the blind is adjustable to a view-shielding position along the outer side of the balcony parallel to the wall and, if necessary, attached to a railing or the like provided there.

The device according to the invention, therefore, can be employed not only as a shield for the sun's rays, but at the same time as a device to secure privacy. As a result, it is especially advantageous that with the use of the device as a privacy securing measure, it is still possible for sunlight to enter the balcony, terrace, etc. over the top of the blind. Moreover, it is obvious that such a device required no additional maintenance as compared to a conventional awning. Finally, when necessary it can be moved without difficulty into a position such that the entrance of sunlight is not interfered with and an unobstructed view from the balcony is possible.

A suitable embodiment of the device according to the invention is designed in such a way that the blind is built from a flat piece of material which is supported at opposite ends by struts which are attached to the wall in such a way as to be rotatable in a vertical plane. With a device of this design, a particularly large number of adjustments can be achieved if the flat piece is itself rotatable about an approximately horizontal axis defined by the connection points with the support struts. In this case a frictional coupling is provided in suitable fashion between the flat shielding member and at least one of the support struts in order to eliminate the necessity for a special locking mechanism for the flat member vis-a-vis the supporting struts. An advantageous construction for the formation of the friction clutch results when a horizontal, outwardly-projecting bearing bolt attached to the flat member is inserted through the free end of the least one of the support struts, and then a coil spring is slipped onto the bolt to bear against the strut and the shoulder of the bolt.

In view of the fact that, in general, the dimensions of building differ, especially the distance between the floors of two balconies lying one above the other and similarly the height of balcony railings, it is further provided in accordance with the invention that the length of the supporting struts be adjustable. The ability for axial extension can be accomplished in this case, e.g., through telescopic design of the struts, whereby set screws or the like serve as the locking mechanism thereby making it additionally possible to design the flat member in such a manner that its level is adjustable.

With this embodiment of the invention it is possible to manufacture the flat member out of a rigid section of, e.g., glass fiber reinforced synthetic resin or similar material, in which case an especially sturdy and durable design results. It is especially desirable, however, if the flat member is fabricated from a frame covered with fabric. The movement of the device is advantageously accomplished in such a way that it is adjustable by means of a rope drive acting on the supporting struts.

Another, special embodiment in accordance with the invention, suitable for installation between vertically adjacent balconies, is characterized by the fact that above the balcony on the wall, or on the underside of the above-lying balcony, as well along the outer side of the balcony and/or the railing designed there, are mounted two parallel beaming rollers, upon which a fabric sheet or the like carried laterally between the rollers is capable of being rolled up.

In this embodiment, the fabric sheet when being used as a sun shield is for the most part rolled up on the upper roller so that only a part of the fabric sheet projects downwards over the balcony or the like. Accordingly, a gap remains open between the balcony, or its railing, and the fabric sheet making possible a view out and/or a view in. When used as a privacy shield the fabric sheet is correspondingly rolled-up on the lower roll so that between the sheet and the upper roller, or the balcony above, a gap remains permitting the entrance of sunshine. Accordingly, if the length of the fabric sheet is at least equal to the distance of travel between the two rollers, there exists the possibility for using the fabric sheet as both a sun shield and a privacy shield at the same time, in which case it is simply unwound off of both rollers so that it covers the entire open area there between.

For guiding the fabric sheet, there may advantageously be employed ropes which are attached at least to the lateral edges of the sheet and are capable of being rolled up respectively on one or the other of the rollers. There can be used as ropes, for example, the conventional blind string, a cord, etc.

Finally, it is within the scope of the invention to provide, in connection with the above described embodiment, deflection elements in at least one position between the two beaming rollers giving rise to a deflection about an axis parallel to the beaming rollers. Coaxial rollers disposed in the vicinity of the guide ropes serve preferably as the deflection elements. The introduction of these deflection elements offers the possibility to allow the fabric sheet to project beyond the planar surface bounded by the two beaming rollers.

BRIEF DESCRIPTION OF THE DRAWINGS

Further features, details and advantages of the invention ensue from the following description of the two foregoing specific embodiments when considered in view of the drawings wherein the device is illustrated schematically and mounted on a balcony, respectively.

Figure 1:
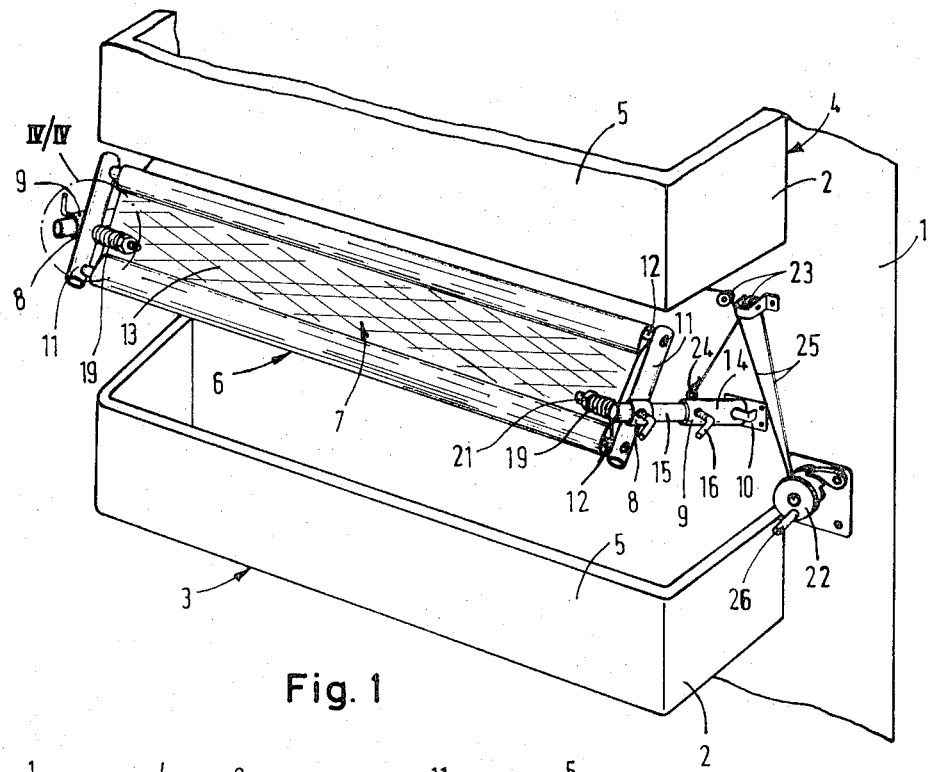
Figures 2, 3, 4:
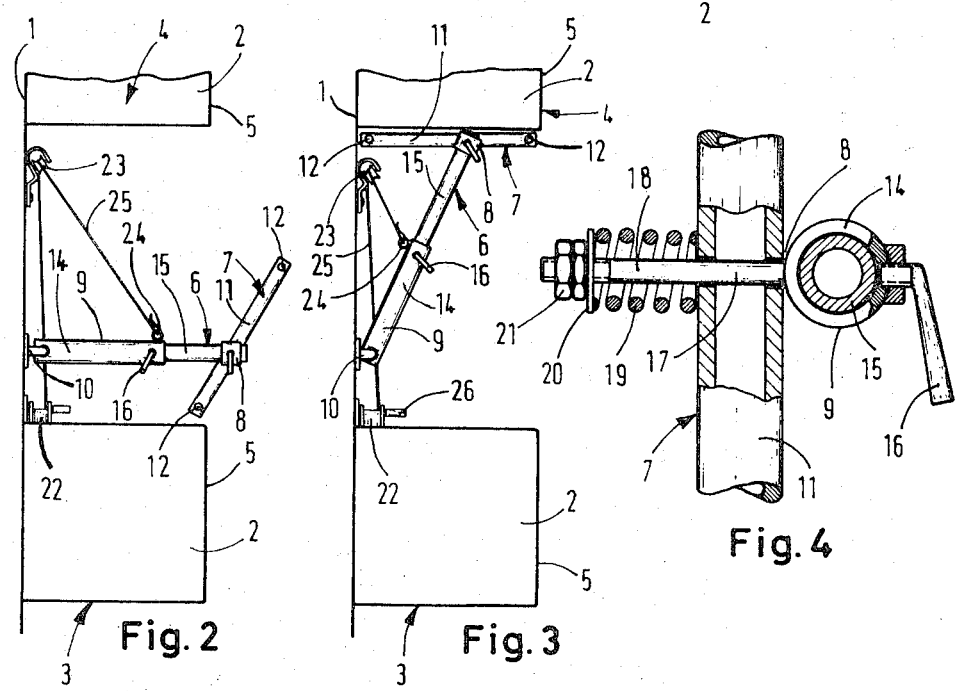
Figure 5:
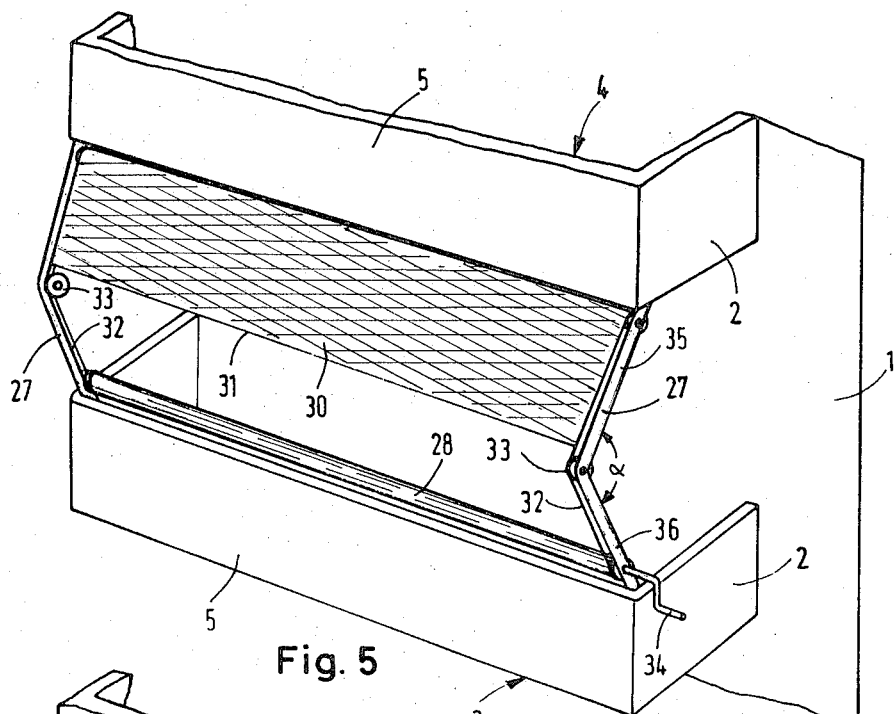

IN THE DRAWINGS:

FIG. 1 is a perspective view of the first specific embodiment in use as a sun shield;

FIG. 2 is a side view of the embodiment of FIG. 1 in use as a privacy screen;

FIG. 3 is an equivalent side view of the device positioned in an inoperative position;

FIG. 4 is a detailed view, partly in section and on an enlarged scale, along the line IV/IV in FIG. 1;

FIG. 5 is a perspective view of the second specific embodiment; and

Figure 6:
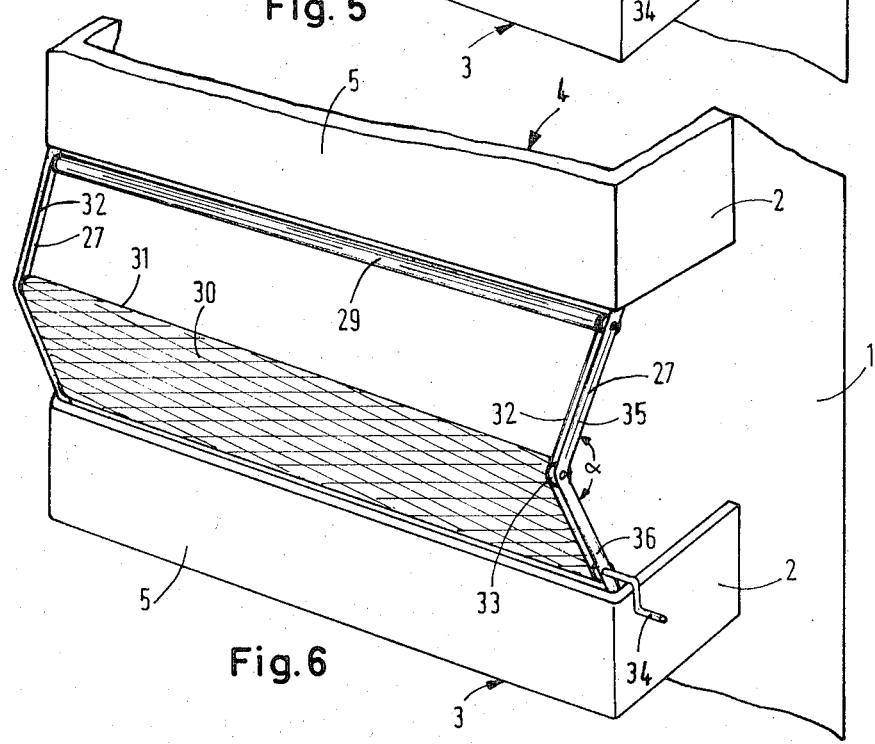

FIG. 6 is a view corresponding to FIG. 5 illustrating the device in use as a sun shield.

DESCRIPTION OF THE PREFERRED EMBODIMENTS

In FIGS. 1–3, 5–6 is seen, schematically at times, a wall of a building 1 on which are arranged respectively one above the other two balconies 3, 4 with railings 2. The long out-facing sides 5 of balconies 3, 4, or the railings 2, extend parallel to the wall 1 in the illustrated embodiments.

In the embodiment illustrated in FIGS. 1–4, the sun shielding device 6 is mounted directly on the wall 1. It shows a flat shield member 7 serving as a blind which is supported at 8 in each case by means of a frictional coupling (which is illustrated on an enlarged scale in FIG. 4) so as to be rotatable on the lateral supporting struts 9, which themselves are mounted in a moveable fashion on wall 1 by means of a hinge 10 or the like.

The flat member 7 is constructed in the illustrated embodiment from a frame consisting of the two lateral tubular supports 11 and two transverse supports 12 covered by fabric 13 or the like. The possibility therefore exists to design the frame in such a manner that the dimensions of the flat member 7 can be changed to fit on different constructional situations, for example, by altering the length of supports 11 and/or 12. This can be accomplished, for example, through telescopic design of the supports 11 and 12. Of course, if this possibility for size variation is not required, the flat member 7 can also be fabricated from a section of a suitably stiff material, e.g., glass fiber-reinforced synthetic resin.

In order to open up further opportunities for adjustment, especially concerning the width of the balcony 3 and the spacing between balconies 3 and 4, the supporting struts 9 are fabricated out of two coaxial tubular sections, one pushed inside the other, which sections are interengageable by means of the setscrew 16 in the appropriate mutual position.

As shown in the magnified illustration of FIG. 4, bearing bolts 17, extending approximately horizontally and passing through the tubular frame member 11, of the flat member serve to bind the flat piece 7 to the supporting struts 9, the bolts being fixed to the distal end 8 of the supporting struts 9. The ends 18 of bolts 17 extend beyond the walls of tubular member 11, possibly on either side, and serve in each case as a carrier for a coil spring 19 which is braced on the one side against the tubular member 11 and on the other side – if necessary under the interposition of a washer 20 – against a shoulder formed, for example, by a nut 21 screwed onto the bearing bolt 17. This produces a frictional coupling between the flat member 7 and the supporting struts 9 which guarantees that the flat member 7 maintains its rotational position respective to the struts 9, and eliminates the necessity for an auxiliary arresting device.

The sun shielding device is moved by means of a cord drive acting on the supporting struts 9. The drive is fabricated from two lengths of rope or cord capable of being jointly wound off of roller 22 and led over guide pulleys 23 to the eyes 24 on the struts 9.

Operation of the sun and/or view shielding device is accomplished in an easy manner merely by adjusting the cord drive by means of the handle 26, and appropriate rotation of the flat member 7. For use as a sun shield, the flat member 7 is brought into the position illustrated in FIG. 1, whereby through suitable raising and lowering by means of the cord drive as well as rotation of the flat member itself in a wide range vis-a-vis the supporting struts, an adaptation to the respective angles of incidence of the sun is possible. On the other hand, if it is desired to use the device as a privacy shield, the flat member 7 is transferred through appropriate lowering of the struts 9 to the position approximately according to FIG. 2. When not in use, the device is ultimately brought into the inoperative position according to FIG. 3, in which the flat member 7 is adjacent to and underneath the floor of the balcony 4 directly above. If no upper balcony 4 is available, there can be chosen as the inoperative position one in which the flat piece 7 rests adjacent and near to the wall 1.

The embodiment of the invention according to FIGS. 5 and 6 is especially, but not exclusively, suited for installation between vertically adjacent balconies.

In this device, horizontal beaming rollers 28 and 29 are mounted respectively above the railing 2 of the lower balcony 3 and directly under the upper balcony 4, e.g., by means of the angular shaped guide rails 27. A fabric sheet 30 is capable of being wound up on either of the beaming rollers, its length in the direction of travel being somewhat greater than the length of its distance of travel through the guide rails 27.

On the longitudinal edges 31 of the fabric sheet 30 in the area of the lateral borders, there are attached in each case rope-like elements, e.g., bands or cords, which are likewise capable of being wound up on rollers 28 and 29. These cords or the like maintain the connection between fabric sheet 30 and rollers 28 and 29 after the unrolling of the sheet 30 from one of the rollers 28 and 29, so that the fabric sheet can still be manipulated.

In the area of the angular bend of the guide rails 27, there is afixed on the inside of each a deflection roller 33 over which the corresponding cord 32 and, therewith, the border of the sheet 30 also, is led. The result is here reached that the portion of the fabric sheet forming the blind in the sun shielding position (FIG. 5) and in the view shielding position (FIG. 6) extends at an angle with respection to the vertical.

For operation of the device according to FIGS. 5 and 6 it is merely required to wind the fabric sheet, by means of the crank 34, correspondingly off of one of the rollers 28 and 29 and onto the other. In this case, the additional possibility is offered to cover, with the sheet 30, the entire distance between the beaming rollers 28 and 29 in order to achieve a complete closure.

It is to be understood that the device illustrated in FIGS. 5 and 6 can, as a result of its design principle, also be used when the upper balcony 4 is not available. In this case, only the guide rails 27 must be designed differently, and, if necessary, auxiliary deflection rollers 33 provided.

A particularly advantageous modification of the specific embodiment according to FIGS. 5 and 6 results when the angle α between the sections 35 and 36 of the guide rails 27 meeting in the vicinity of the deflection rollers 33 can be altered, because then it is possible to exactly accommodate the device to the respective conditions, e.g., the angle of incidence of the sun or the direction of the incoming view. In this case, it is necessary, of course, that the sections 35 and 36 be mounted so as to be rotatable not only with respect to each other but also with respect to the balconies. Moreover, the possibility for adjusting the overall length of the guide rails 27 must likewise be provided, for example, by telescopic design of at least one of the sections 35 or 36.

What is claimed is:

1. A device for shielding sunlight and securing privacy in an outside structure adjacent to a building wall, said device comprising a blind member and support means for said blind member adapted for mounting in fixed relation to such structure, said support means being adjustable to enable movement of said blind member into a sunlight-shielding position above such structure and extending obliquely and outwardly from an upper rear edge to a lower forward edge of said blind member with respect to said building and further adjustable to enable movement of said blind member into a lower view shielding position extending obliquely and outwardly from a lower rear edge to an upper forward edge of said blind member with respect to said building and parallel to the wall thereof.

2. A device according to claim 1, wherein said blind member comprises a rigid, substantially planar member and said support means comprise two support members attached to opposite ends of said blind member and being rotatable in a plane vertical to the wall.

3. A device according to claim 2, wherein said blind member is rotatable about a substantially horizontal axis terminated at each end by said support members, and wherein at least one of said support members is connected to the blind member through a frictional coupling.

4. A device according to claim 3, further comprising means to vary the length of said support members.

5. A device according to claim 2, further comprising means to restrain said support members in an indefinite number of positions intermediate their lowest and highest points of adjustment.

6. A device according to claim 5, further comprising a rope-operated driving means for adjusting said support members.

7. A device according to claim 1, especially adapted for use between two vertically adjacent balconies, wherein said support means comprises two horizontally spaced, parallel roller members, one lying contiguous to the said outer side of the balcony and the other lying contiguous to the underside of the vertically superior balcony, and said blind member comprises a fabric sheet positioned between said rollers and being windable upon either.

8. A device according to claim 7, further comprising cord-like elements fastened to at least the lateral borders of said fabric sheet and being further secured to and rotatable about said rollers in order to serve as guiding means for said sheet.

9. A device according to claim 7, further comprising in at least one position at both lateral ends of said fabric sheet between said rollers a means for deflecting said sheet out of the plane defined by said rollers.

10. A device according to claim 9, wherein said support means further comprise two angularly shaped guide rail members positioned between each pair of lateral ends of said rollers, the apex in each of said angularly shaped members providing said deflection means.

11. A device according to claim 10, further comprising means to vary the apex angle of said guide rail members.

* * * * *